US011870126B2

(12) United States Patent
Lin et al.

(10) Patent No.: US 11,870,126 B2
(45) Date of Patent: Jan. 9, 2024

(54) MIMO ANTENNA SYSTEM CAPABLE OF PROVIDING ENHANCED ISOLATION FOR BACKGROUND SCANNING ANTENNA, AND ISOLATOR MODULE THEREOF

(71) Applicant: Alpha Networks Inc., Hsinchu (TW)

(72) Inventors: Kuang Wei Lin, Hsinchu (TW); Chih Jen Cheng, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 0 days.

(21) Appl. No.: 17/668,339

(22) Filed: Feb. 9, 2022

(65) Prior Publication Data

US 2022/0416413 A1 Dec. 29, 2022

(30) Foreign Application Priority Data

Jun. 24, 2021 (TW) ................................ 110123176

(51) Int. Cl.
*H01Q 1/52* (2006.01)
*H01Q 21/06* (2006.01)

(52) U.S. Cl.
CPC ........... *H01Q 1/523* (2013.01); *H01Q 21/065* (2013.01)

(58) Field of Classification Search
CPC ...... H01Q 1/523; H01Q 21/065; H01Q 21/28; H01Q 13/10; H01Q 1/2291; H01Q 1/521; H01Q 1/526; H01Q 5/42; H01Q 9/42; H01Q 15/008
See application file for complete search history.

(56) References Cited

U.S. PATENT DOCUMENTS

2017/0317421 A1* 11/2017 Grando ................ H01Q 15/006
2020/0388924 A1* 12/2020 Lee ........................ H01Q 9/045

FOREIGN PATENT DOCUMENTS

| | | | |
|---|---|---|---|
| CN | 101652898 | A | 2/2010 |
| CN | 104157982 | A | 11/2014 |
| CN | 107431270 | A | 12/2017 |
| CN | 107994353 | A | 5/2018 |
| CN | 111916902 | A | 11/2020 |

* cited by examiner

*Primary Examiner* — Hoang V Nguyen
(74) *Attorney, Agent, or Firm* — CIPO IP Group

(57) ABSTRACT

A multi-input multi-output (MIMO) antenna system includes a metal plate, a background scanning antenna, a plurality of working antennas, and an isolator module. The isolator module is mountable on the metal plate and includes a plurality of isolators that are in a ring configuration to form an isolated space therein, so that the background scanning antenna can be located in the isolated space and a plurality of working antennas are located outside of the isolated space, thereby ensuring good isolation of the background scanning antenna from the working antennas by the design of the isolator module.

13 Claims, 18 Drawing Sheets

MIMO ANTENNA SYSTEM CAPABLE OF PROVIDING ENHANCED ISOLATION FOR BACKGROUND SCANNING ANTENNA, AND ISOLATOR MODULE THEREOF

CROSS-REFERENCE TO RELATED PATENT APPLICATION

This non-provisional application claims priority to and the benefit of, under 35 U.S.C. § 119(a). Taiwan Patent Application No. 110123176, filed Jun. 24, 2021 in Taiwan. The entire content of the above identified application is incorporated herein by reference.

FIELD

The present disclosure relates to a multi-input multi-output (MIMO) antenna system, and more particularly to a MIMO antenna system having an isolator module in a ring configuration, in which a background scanning antenna is in an isolated space of the isolator module and a plurality of working antennas are located outside of the isolated space.

BACKGROUND

With the rapid advancement of the wireless communication industry, wireless communication devices have been improved and upgraded continually. In the meantime, market requirements for such devices have evolved beyond a thin and compact design to also include communication quality, such as the stability of signal transmission. "Antennas" are a key element of wireless communication devices and are indispensable to the reception and transmission of wireless signals and to data transfer. The development of antenna technologies has been a focus of attention in the related technical fields as the wireless communication industry continues to flourish.

An antenna is an electrical conductor designed to transmit electromagnetic energy into a space or receive electromagnetic energy from a space. In order to increase data rate and channel capacity, the MIMO antenna system has been widely used, which nevertheless has increased the number of antennas required for an electronic device manyfold. A MIMO antenna system does enable an increase in throughput in an existing bandwidth, but what follows is an increasingly small distance between multiple antennas in a limited space. The mutual coupling effect of adjacent antennas reduces isolation between the antennas and thus leads to poor radiation quality. The problem is especially acute when certain antennas in a MIMO antenna system use the same operating band.

Besides, there are usually a plurality of wireless access points or wireless routers in the network environment of an area (e.g., an office or hypermarket). Some wireless networking products, therefore, are additionally provided with a background scanning function for detecting if the area where such a wireless networking product is located has any wireless communication device that may interfere with the wireless communication ability of the wireless networking product. For example, a wireless networking product may, upon detecting a wireless communication device that uses the same frequency band as itself and may thus cause interference, adjust its own frequency for wireless communication in order to ensure communication quality. The background scanning function, however, cannot be performed without an additional background scanning antenna. As the IEEE802.11ac standard for wireless networking specifies 2.4 GHz to 2.484 GHz and 5.15 GHz to 5.875 GHz as the operating bands of Wi-Fi for wireless communication systems that are currently in common use, the provision of a background scanning antenna in the limited space of a wireless access point or wireless router in addition to an antenna for 2.4 GHz/5 GHz Wi-Fi and an antenna for 2.4 GHz IoT calls for proper isolation of the background scanning antenna in both operating bands (2.4 GHz/5 GHz) of the other antennas, or the expected radiation quality cannot be achieved.

Conventionally, the following methods are used to improve isolation between antennas. The first method is to increase the distance between each two adjacent antennas. This method, however, requires a relatively large space and hence works against the design trend toward thinner and more compact wireless communication devices. The second method for improving antenna isolation is to add a decoupling element between multiple antennas, as shown in FIG. 1, in which a MIMO antenna system 1 includes a metal plate 10, a plurality of antenna units 12, and a plurality of grounding isolating elements 14. The antenna units 12 and the grounding isolating elements 14 are located on a grounding portion of the metal plate 10. Each grounding isolating element 14 is spaced apart from the corresponding antenna unit 12 by about one fourth of the wavelength of the signal to be received by the antenna units 12, has an extension length approximately equal to one fourth of the wavelength, is configured as a monopole antenna, and therefore tends to compress the radiation pattern of the corresponding antenna unit 12.

The third method is to provide an isolating slit between each two adjacent antennas, as shown in FIG. 2, in which a MIMO antenna system 2 includes a metal plate 20 and a plurality of antenna units 22. The antenna units 22 are located on a grounding portion of the metal plate 20, with one or two isolating slits 24 provided between each two adjacent antenna units 22. However, the isolating slits 24 not only impair the structure of the grounding portion, but also may have adverse effects on signal transmission by the MIMO antenna system 2. Moreover, when the number of the antenna units 22 is increased, the number of the isolating slits 24 must also be increased. Therefore, it can easily cause the MIMO antenna system 2 to produce electromagnetic compatibility (EMC)/electromagnetic interference (EMI) that degrades communication quality.

SUMMARY

Based on years of expertise and rich practical experience in various antenna system design, processing and manufacturing, excelling research spirit, and longtime labored research and experiment, and to stand out in a heavily competitive market, the present disclosure provides a MIMO antenna system capable of providing enhanced isolation for a background scanning antenna, and an isolator module thereof, so as to provide better user experience to users.

One aspect of the present disclosure is directed to a MIMO antenna system. The MIMO antenna system includes a metal plate, a background scanning antenna, a plurality of working antennas and an isolator module. The background scanning antenna is located on the metal plate and can detect at least one radio-frequency signal in a scanning area. The plurality of working antennas are located on the metal plate, and each working antenna is spaced apart from the background scanning antenna. The isolator module is mountable to the metal plate, and includes a plurality of isolators. The isolators are arranged annularly to form an isolated space surrounded by the isolators. The isolator module is located between the working antennas and the background scanning antenna such that the background scanning antenna is in the isolated space and the working antennas lie outside of the isolated space.

In certain embodiments, each of the isolators includes a dielectric substrate, a metallic patch located at a top surface of the dielectric substrate, a grounding layer located at a bottom surface of the dielectric substrate and connectable to the metal plate, and a metal post penetrating the dielectric substrate and having a top end connectable to the metallic patch and a bottom end connectable to the grounding layer.

In certain embodiments, each of the isolators includes a dielectric substrate, a metallic patch located at a top surface of the dielectric substrate, and a metal post penetrating the dielectric substrate and having a top end connectable to the metallic patch and a bottom end connectable to the metal plate.

In certain embodiments, the dielectric substrate of each of the isolators is integrally formed with each other as a single unit.

In certain embodiments, the metallic patches of the isolators are spaced apart from each other.

In certain embodiments, the isolators are arranged as an inner ring and an outer ring adjacent to and surrounding the inner ring to form the isolator module in a two-ring configuration.

In certain embodiments, a top area of each metallic patch in the outer ring is larger than a top area of each metallic patch in the inner ring.

In certain embodiments, the metal plate is connected to a grounding.

Another aspect of the present disclosure is directed to an isolator module for increasing isolation of a background scanning antenna. The isolator module includes a plurality of isolators arranged annularly to form an isolated space surrounded by the isolators for placing the background scanning antenna therein and isolating a plurality of working antennas from the isolated space and the background scanning antenna therein.

In certain embodiments, each of the isolators includes a dielectric substrate, a metallic patch located at a top surface of the dielectric substrate, a grounding layer located at a bottom surface of the dielectric substrate, and a metal post penetrating the dielectric substrate and having a top end connectable to the metallic patch and a bottom end connectable to the grounding layer.

In certain embodiments, each of the isolators includes a dielectric substrate, a metallic patch located at a top surface of the dielectric substrate, and a metal post penetrating the dielectric substrate and having a top end connectable to the metallic patch and a bottom end extending out of the dielectric substrate and connectable to a metal plate for carrying the background scanning antenna and the working antennas.

In certain embodiments, the dielectric substrate of each of the isolators is integrally formed with each other as a single unit.

In certain embodiments, the metallic patches of the isolators are spaced apart from each other.

In certain embodiments, the isolators are arranged as an inner ring and an outer ring adjacent to and surrounding the inner ring to form the isolator module in a two-ring configuration.

In certain embodiments, a top area of each metallic patch in the outer ring is larger than a top area of each metallic patch in the inner ring.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
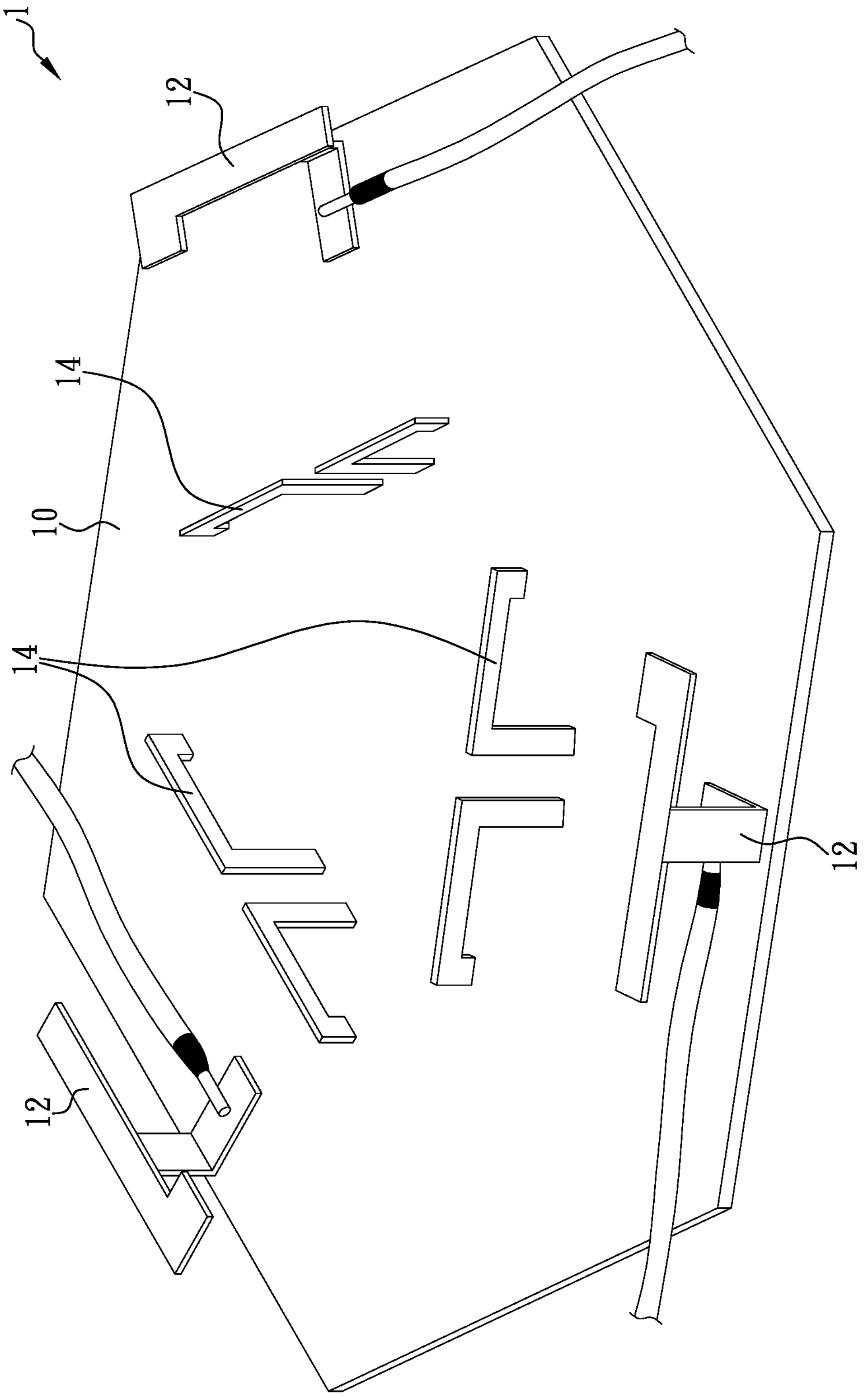
FIG. 1(Prior Art)
FIG. 1 is a schematic diagram of a conventional antenna system added with a decoupling element between multiple antennas.
Figure 2:
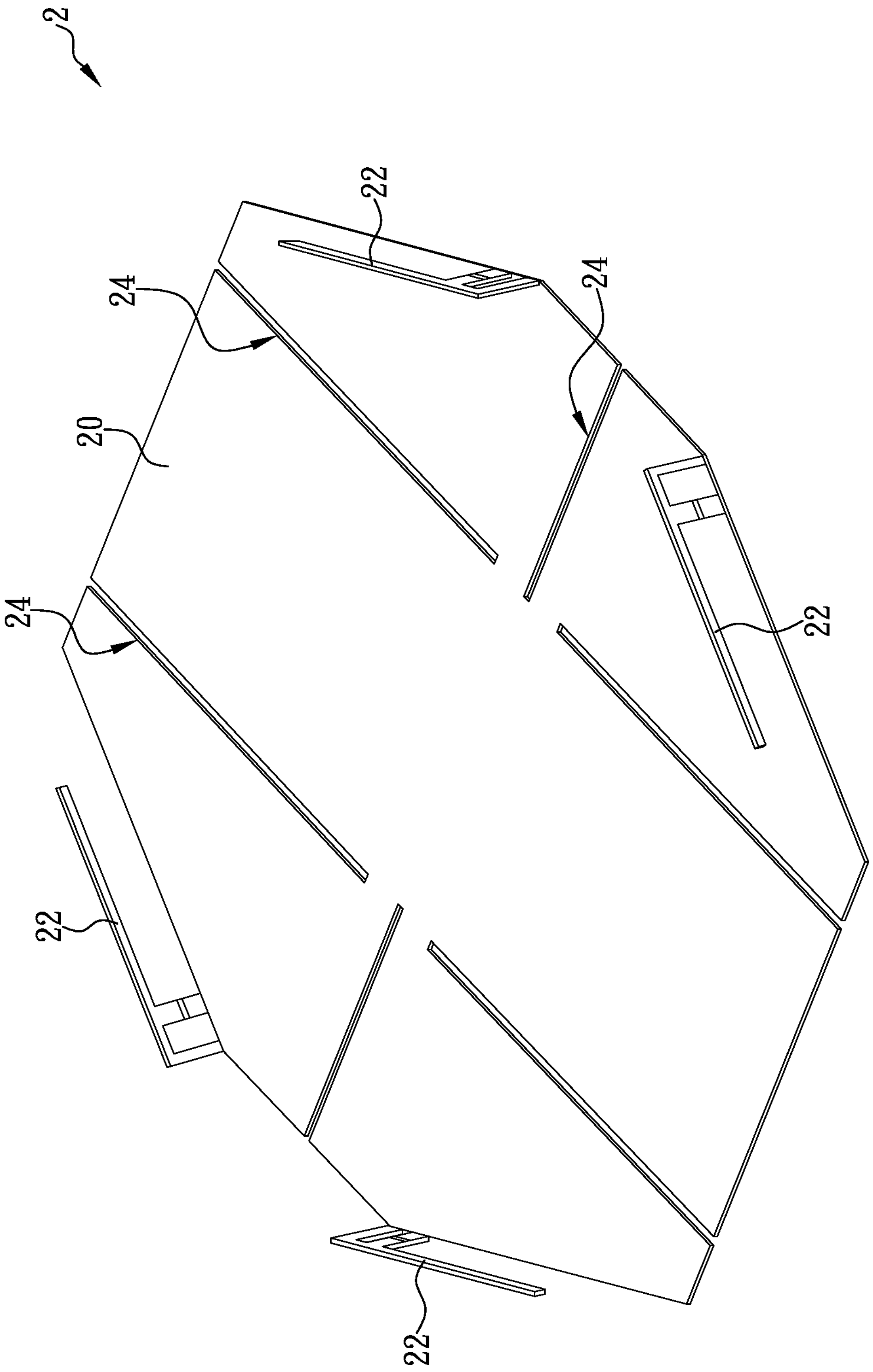
FIG. 2(Prior Art)
FIG. 2 is a schematic diagram of a conventional antenna system provided with an isolating slit between multiple antennas.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

The present disclosure provides a MIMO antenna system capable of providing enhanced isolation for a background scanning antenna, and an isolator module of the MIMO antenna system. In certain embodiments, referring to FIG. 3, a MIMO antenna system S includes a metal plate 3, a plurality of working antennas 4, a background scanning antenna 5, and an isolator module 6. The entirety or a portion of the metal plate 3 can be connected to a grounding so as to form a grounding portion. The background scanning antenna 5 and the working antennas 4 are provided on the metal plate 3 and may be located on the grounding portion of the metal plate 3. In certain embodiments, the working antennas 4 include four low-frequency antennas 411, 412, 413, and 414 and four high-frequency antennas 421, 422, 423, and 424. The low-frequency antennas 411, 412, 413, and 414 use the 2.4 GHz operating band, and the high-frequency antennas 421, 422, 423, and 424 use the 5 GHz operating band. The low-frequency antennas 411, 412, 413, and 414 and the high-frequency antennas 421, 422, 423, and 424 are alternately arranged at a peripheral portion of the metal plate 3 such that a single low-frequency antenna 411, 412, 413, or 414 and a single high-frequency antenna 421, 422, 423, or 424 are provided adjacent to each of the four edges of the top surface of the metal plate 3, as shown in FIG. 3.

Figure 3:
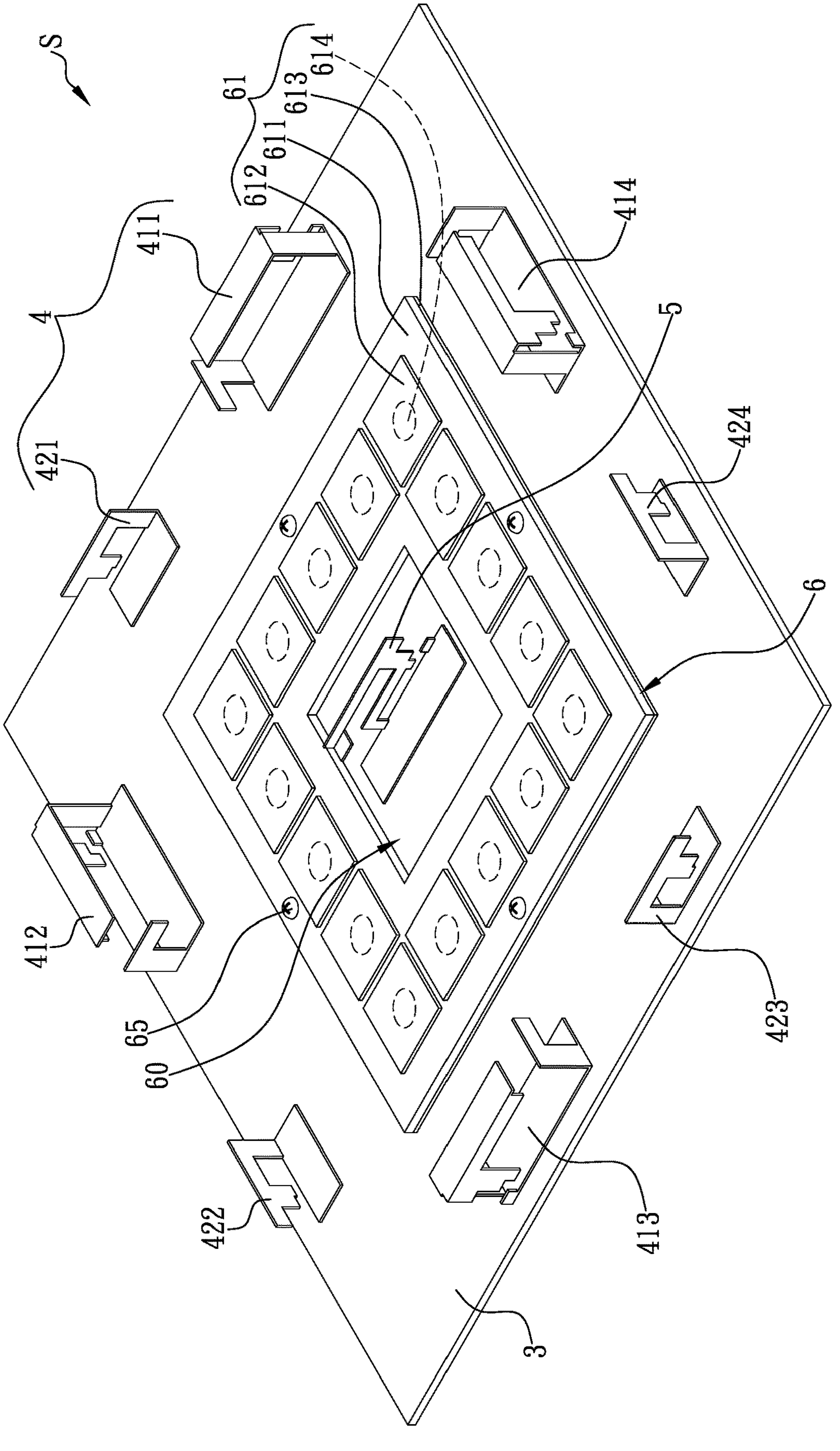
FIG. 3 is a schematic diagram of a MIMO antenna system according to certain embodiments of the present disclosure.

With continued reference to FIG. 3, the background scanning antenna 5 is located on the grounding portion of the metal plate 3 and is configured to detect at least one radio-frequency signal in a scanning area. In certain embodiments, the background scanning antenna 5 can operate in both the 2.4 GHz and the 5 GHz operating bands, is located in a central area of the metal plate 3, and is spaced apart from the working antennas 4. However, the present disclosure is not limited thereto, and the number, locations, and operating bands of the working antennas 4 can be adjusted according to practical needs. For example, the working antennas 4 may have only one operating band and therefore need not be identified as low-frequency or high-frequency. Similarly, the background scanning antenna 5 may have only one operating band rather than two.

Figure 4:
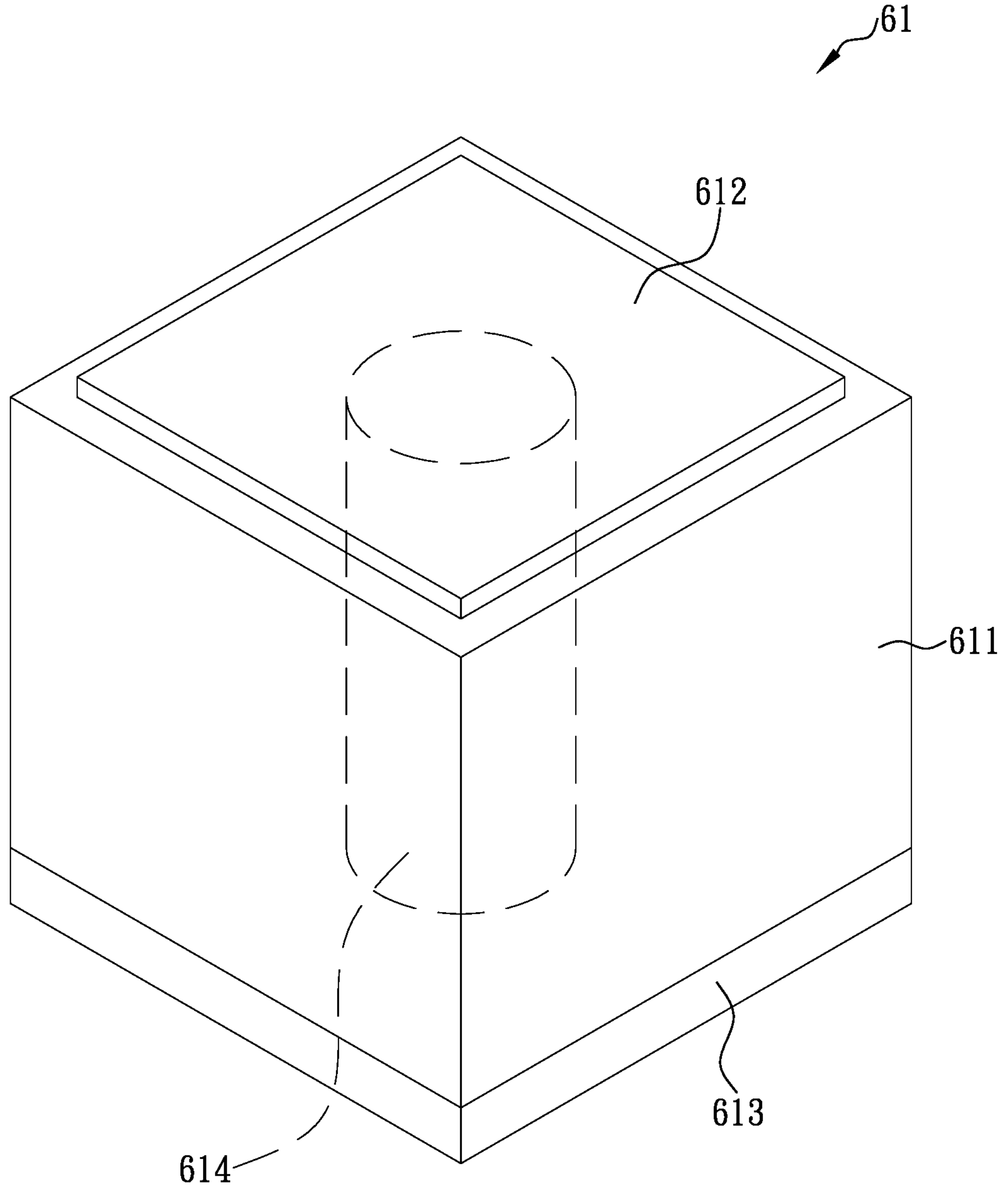
FIG. 4 is a perspective view of an isolator module according to certain embodiments of the present disclosure.
Figure 5:
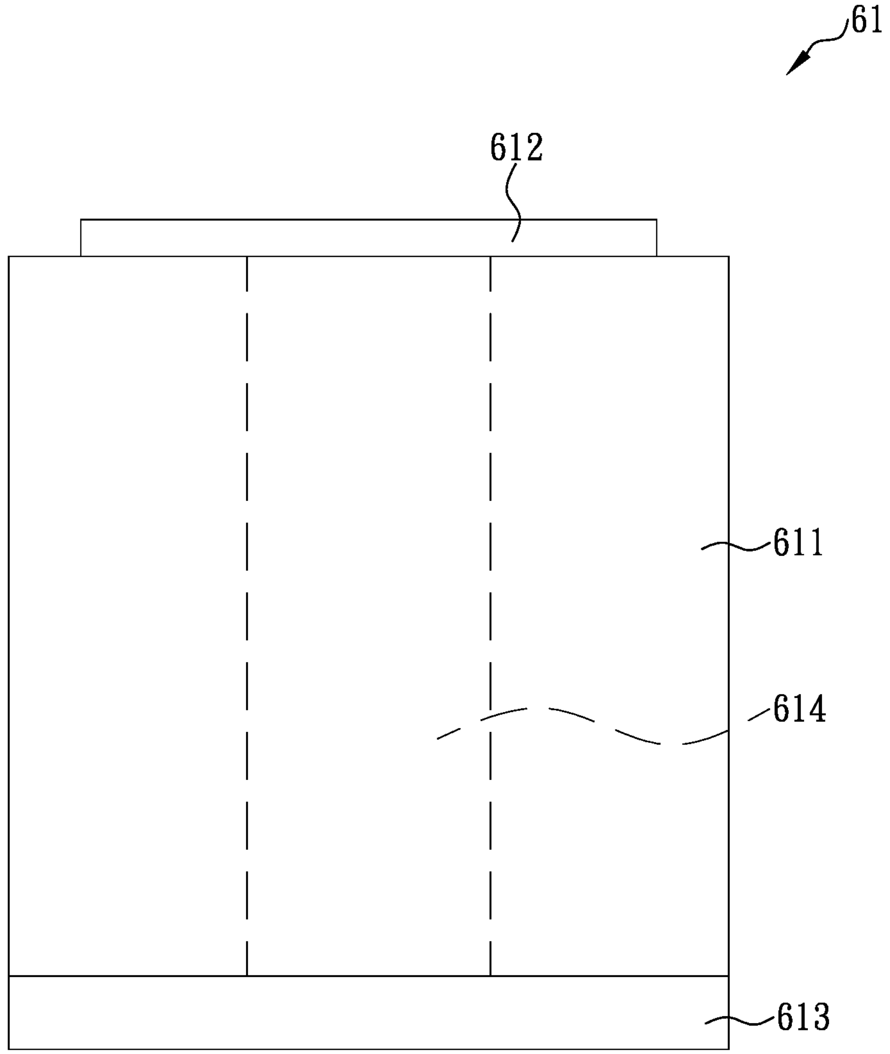
FIG. 5 is a side view of the isolator module according to certain embodiments of the present disclosure.

With continued reference to FIG. 3, the isolator module 6 includes a plurality of isolators 61. The isolators 61 can be arranged annularly to form an isolated space 60 surrounded by the isolators 61. The isolator module 6 can be mounted on the metal plate 3 and be located between the working antennas 4 and the background scanning antenna 5 such that the background scanning antenna 5 is in the isolated space 60, with the working antennas 4 lying outside of the isolated space 60 and isolated by the isolator module 6 across the metal plate 3. Referring to FIG. 4 and FIG. 5, each isolator 61 includes a dielectric substrate 611, a metallic patch 612, a grounding layer 613, and a metal post 614, wherein: the metallic patch 612 is provided on the top surface of the dielectric substrate 611, the grounding layer 613 is provided on the bottom surface of the dielectric substrate 611, and the metal post 614 is provided in the dielectric substrate 611 and can extend out of the dielectric substrate 611 such that the top end and the bottom end of the metal post 614 can be connected to the metallic patch 612 and the grounding layer 613 respectively. The equivalent circuit model of each isolator 61, therefore, can be an LC parallel resonant circuit whose inductance (L) and capacitance (C) can be changed by adjusting the dimensions of the metallic patch 612 of the isolator 61, the height or dielectric constant of the dielectric substrate 611, or the diameter of the metal post 614, in order to create parallel resonance in the intended antenna operating band, suppress the coupling current, and thereby enhance isolation of the background scanning antenna 5 from each working antenna 4 in the same operating band. The grounding layers 613 of the isolators 61 need not be directly connected to each other and can be spaced apart from one another.

The isolator module 6 according to the present disclosure can have numerous variations to suit the practical requirements or manufacturing processes of different products. For example, the isolators 61 in certain embodiments can dispense with the grounding layer 613 in FIG. 4 and have the bottom end of each metal post 614 directly connected to the metal plate 3, and in that case, the circuit model of an LC parallel resonant circuit can still be formed. Or, in contrast to the metal post 614 shown in FIG. 5, whose two ends abut against the metallic patch 612 and the grounding layer 613 respectively, the metal posts 614 in certain embodiments can each have one or two ends extending through the corresponding metallic patch 612 or grounding layer 613 in order to increase the stability of connection, and electrical conduction, between the aforesaid components. Or, each of the metallic patches 612 in certain embodiments can have a different shape from the rectangular one shown in the drawings. For example, the metallic patch 612 may be circular, hexagonal, or star-shaped, among others. In addition, the isolators 61 may be independent components sequentially arranged and fixed on the metal plate 3 annularly. In certain embodiments, the dielectric substrates 611 and/or the grounding layers 613 of the isolators 61 can be integrally formed as a single unit, with a plurality of metallic patches 612 provided at intervals, that is, spaced apart from each other, on the single dielectric substrate 611, and a plurality of metal posts 614 provided at intervals (such as being spaced apart from each other) in the single dielectric substrate 611 to form the isolator module 6 defined in the present disclosure.

Figure 6:
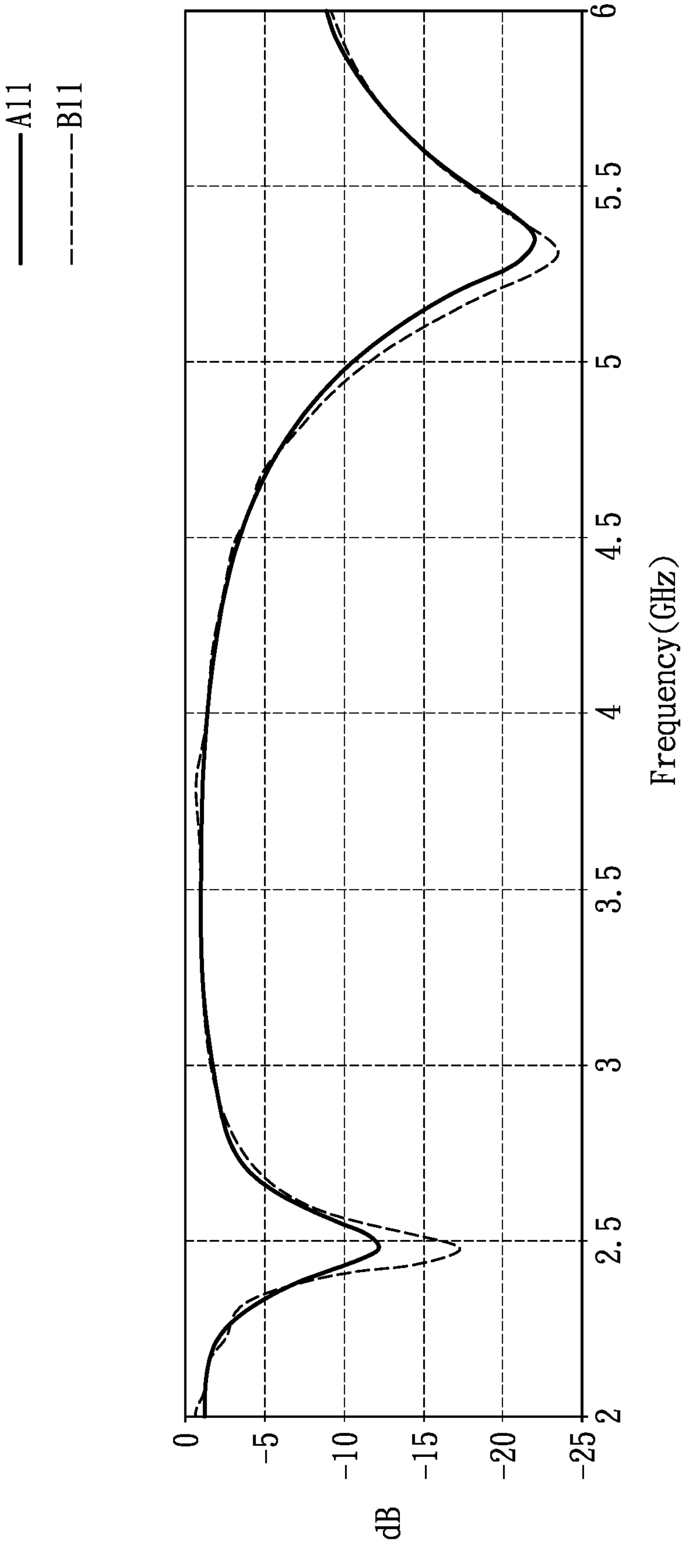
FIG. 6 is a return loss test diagram showing a MIMO antenna system with and without an isolator module according to certain embodiments of the present disclosure.

In certain embodiments, referring again to FIG. 3, the isolator module 6 is fixed on the metal plate 3 with a plurality of fixing elements 65 (e.g., plastic rivets), and the background scanning antenna 5 is at the center of the isolated space 60. Therefore, when it is desired to apply the background scanning antenna 5 to a different operating band, the isolator module 6 can be easily detached and replaced by a different one, which provides convenience of use. Besides, in certain embodiments, it is so designed that the isolator module 6 uses a single dielectric substrate 611, that the top surface of the dielectric substrate 611 is provided with a plurality of metallic patches 612 arranged in a single ring, that the metallic patches 612 are not in contact with one another, that a plurality of metal posts 614 are provided in the dielectric substrate 611, and that the bottom surface of the dielectric substrate 611 is provided with a plurality of grounding layers 613 arranged in a single ring. In certain embodiments, in which tests have been performed and the following test results have been produced as shown in FIG. 6, curve A11 represents the return loss experienced by the background scanning antenna 5 when the M IMO antenna system S does not include the isolator module 6, and curve B11 represents the return loss experienced by the background scanning antenna 5 when the MIMO antenna system S includes the isolator module 6. A comparison of the two curves clearly shows that the isolator module 6 does not have negative effect on the operating band of the background scanning antenna 5 and helps the background scanning antenna 5 to have better performance in terms of return loss.

Figure 7:
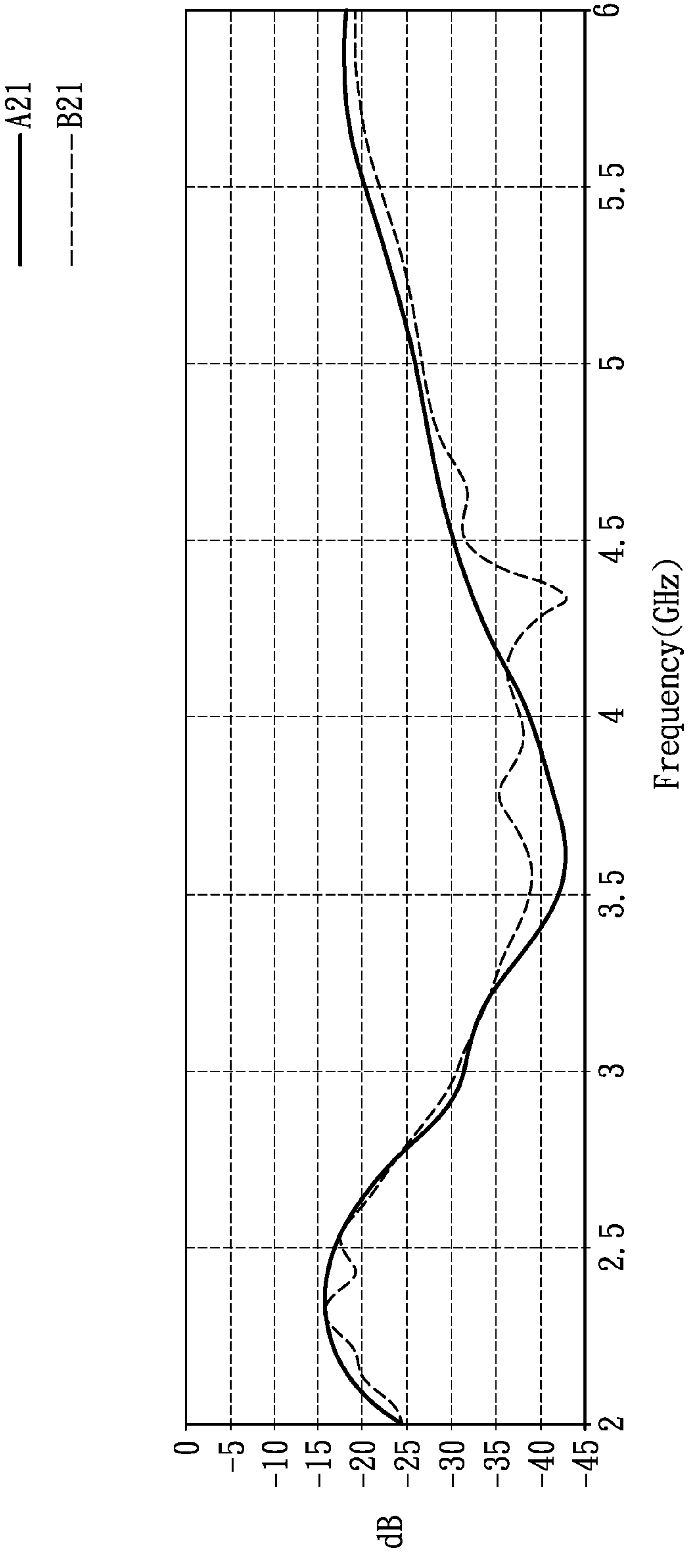
FIG. 7 is an isolation test diagram showing the MIMO antenna system with and without the isolator module in the 2.4 GHz operating band according to certain embodiments of the present disclosure.
Figure 8:
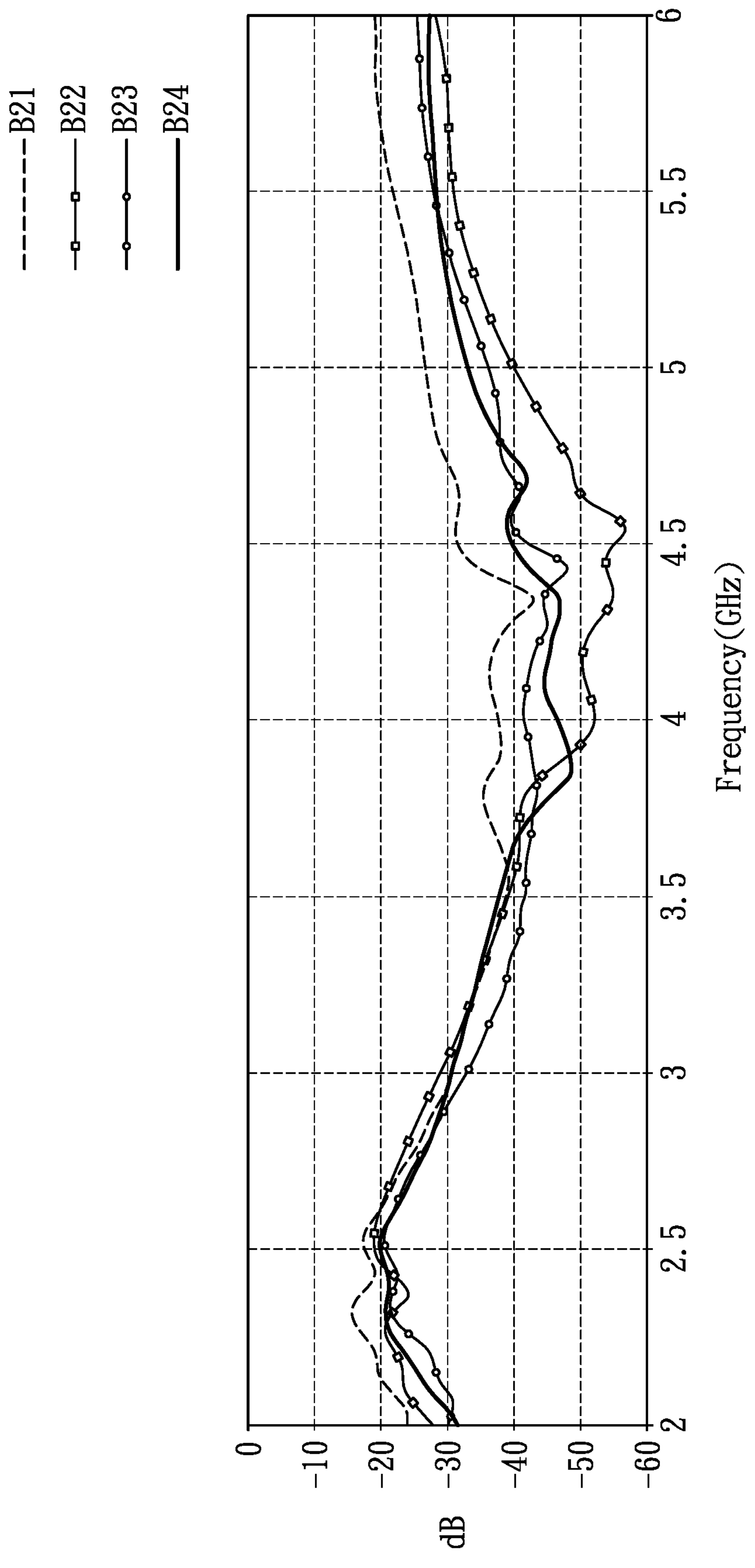
FIG. 8 is an isolation test diagram showing the isolation of the MIMO antenna system from respective low-frequency antennas in the 2.4 GHz operating band according to certain embodiments of the present disclosure.

Referring to the test results in FIG. 7 in conjunction with FIG. 3, when the MIMO antenna system S does not include the isolator module 6, the background scanning antenna 5 is isolated from the low-frequency antenna 411 shown in an upper portion of FIG. 3 to the extent represented by curve A21, and when the MIMO antenna system S includes the isolator module 6, the background scanning antenna 5 is isolated from the low-frequency antenna 411 to the extent represented by curve B21. As can be seen in FIG. 7, curve B21 has a resonance mode in the 2.4 GHz operating band, indicating that isolation of the background scanning antenna 5 from the low-frequency antenna 411 is enhanced. Referring to the test results shown in FIG. 8, when the MIMO antenna system S includes the isolator module 6, the background scanning antenna 5 is isolated from the low-frequency antennas 411, 412, 413, and 414 to the extents represented respectively by curves B21, B22, B23, and B24. Since all the curves B21, B22, B23, and B24 have a resonance mode in the 2.4 GHz operating band, it can be known that isolation of the background scanning antenna 5 from the low-frequency antennas 411, 412, 413, and 414 is effectively enhanced.

Figure 9:
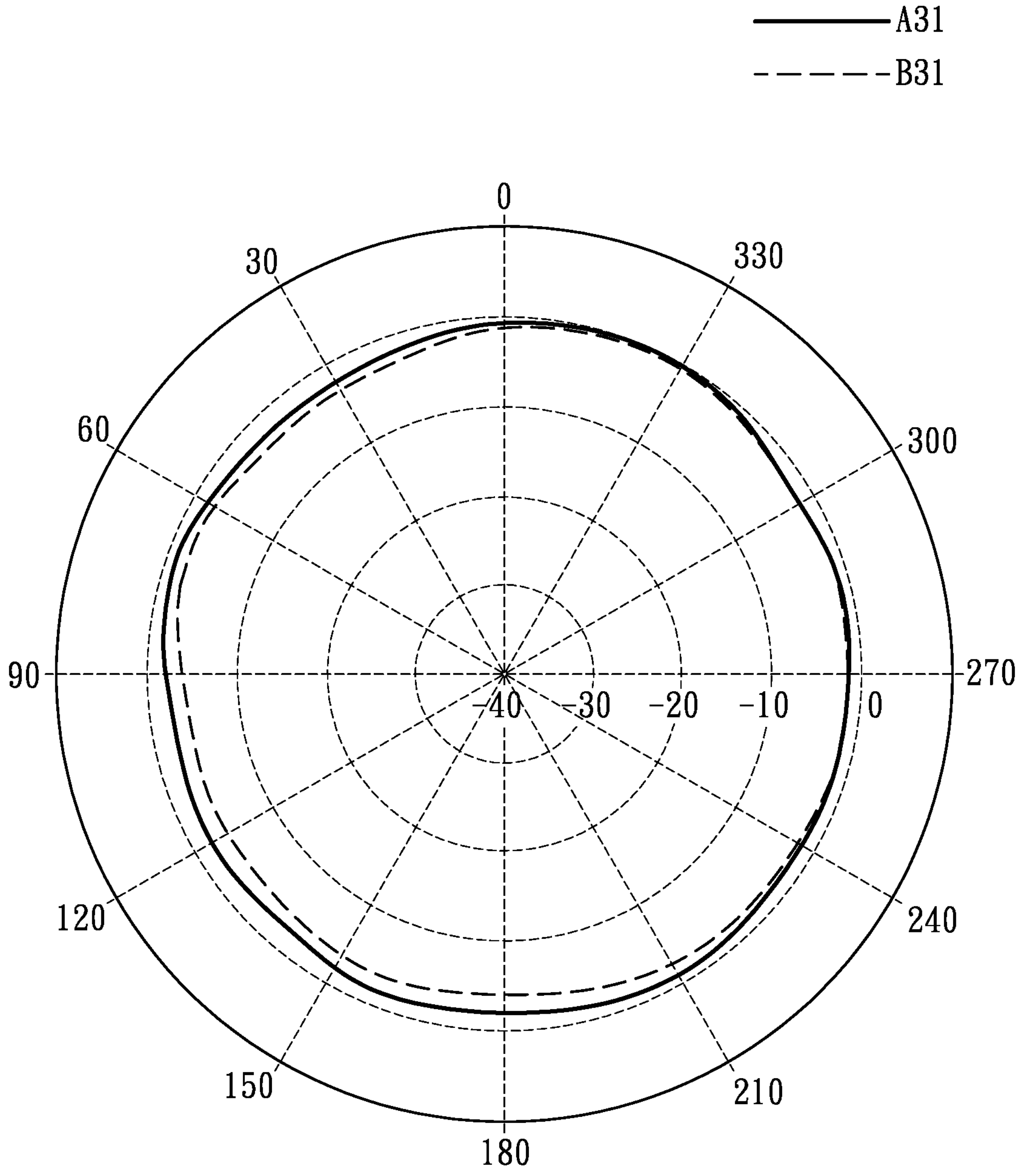
FIG. 9 is a 2.4 GHz radiation pattern diagram of a background scanning antenna in the MIMO antenna system with and without the isolator module according to certain embodiments of the present disclosure.
Figure 10:
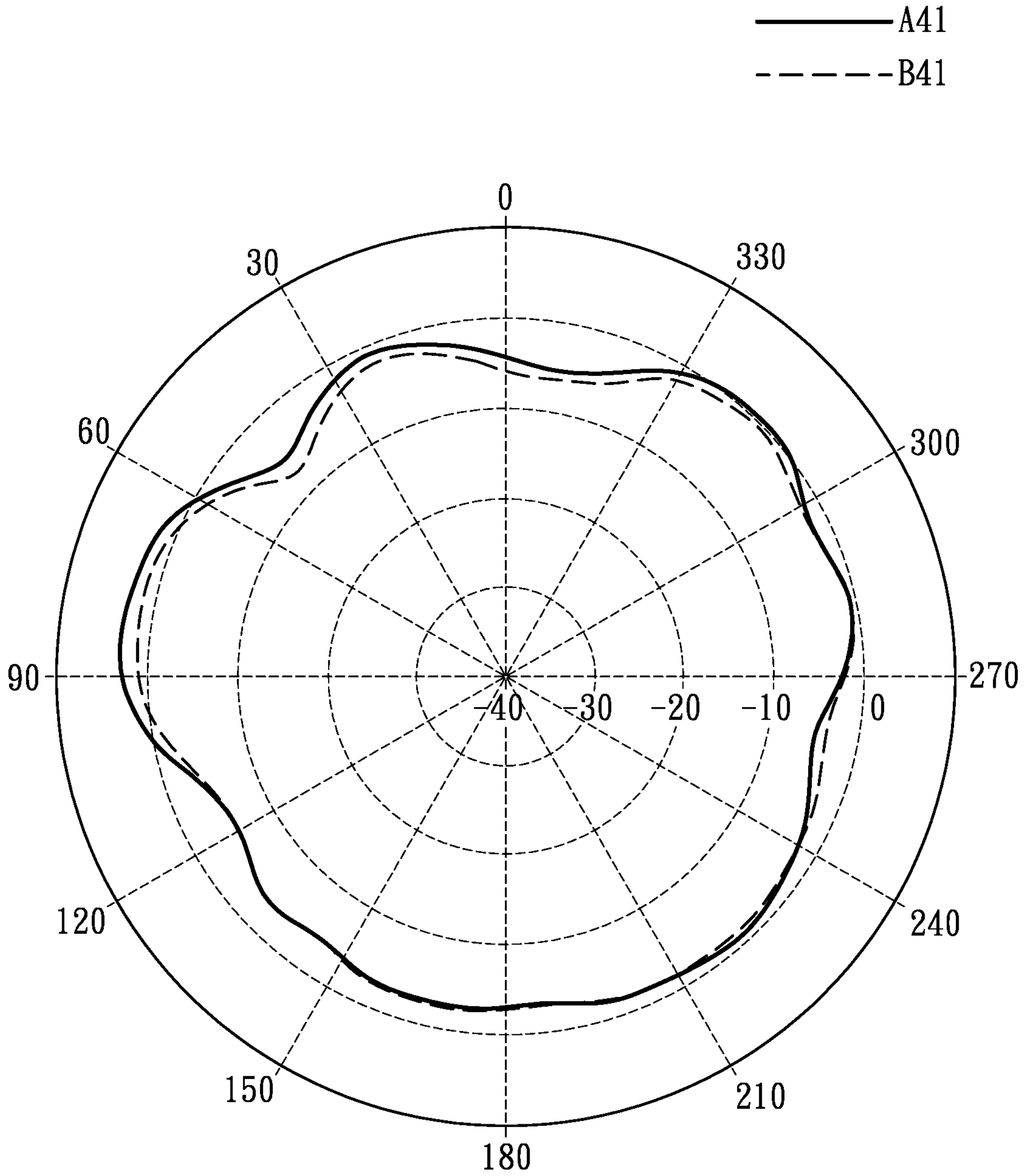
FIG. 10 is a 5.5 GHz radiation pattern diagram of the background scanning antenna in the MIMO antenna system with and without the isolator module according to certain embodiments of the present disclosure.

Referring to the test results shown in FIG. 9, when the MIMO antenna system S does not include the isolator module 6, the background scanning antenna 5 has a 2.4 GHz radiation pattern represented by curve A31; and when the MIMO antenna system S includes the isolator module 6, the background scanning antenna 5 has a 2.4 GHz radiation pattern represented by curve B31. It can be seen in FIG. 9 that when the MIMO antenna system S includes the isolator module 6, the radiation pattern of the background scanning antenna 5 remains nearly omnidirectional in the XY plane. Referring to FIG. 10, when the MIMO antenna system S does not include the isolator module 6, the background scanning antenna 5 has a 5.5 GHz radiation pattern represented by curve A41, and when the MIMO antenna system S includes the isolator module 6, the background scanning antenna 5 has a 5.5 GHz radiation pattern represented by curve 41. It can be seen in FIG. 10 that when the MIMO antenna system S includes the isolator module 6, the radiation pattern of the background scanning antenna 5 does not show significant deformation in the XY plane.

Figure 11:
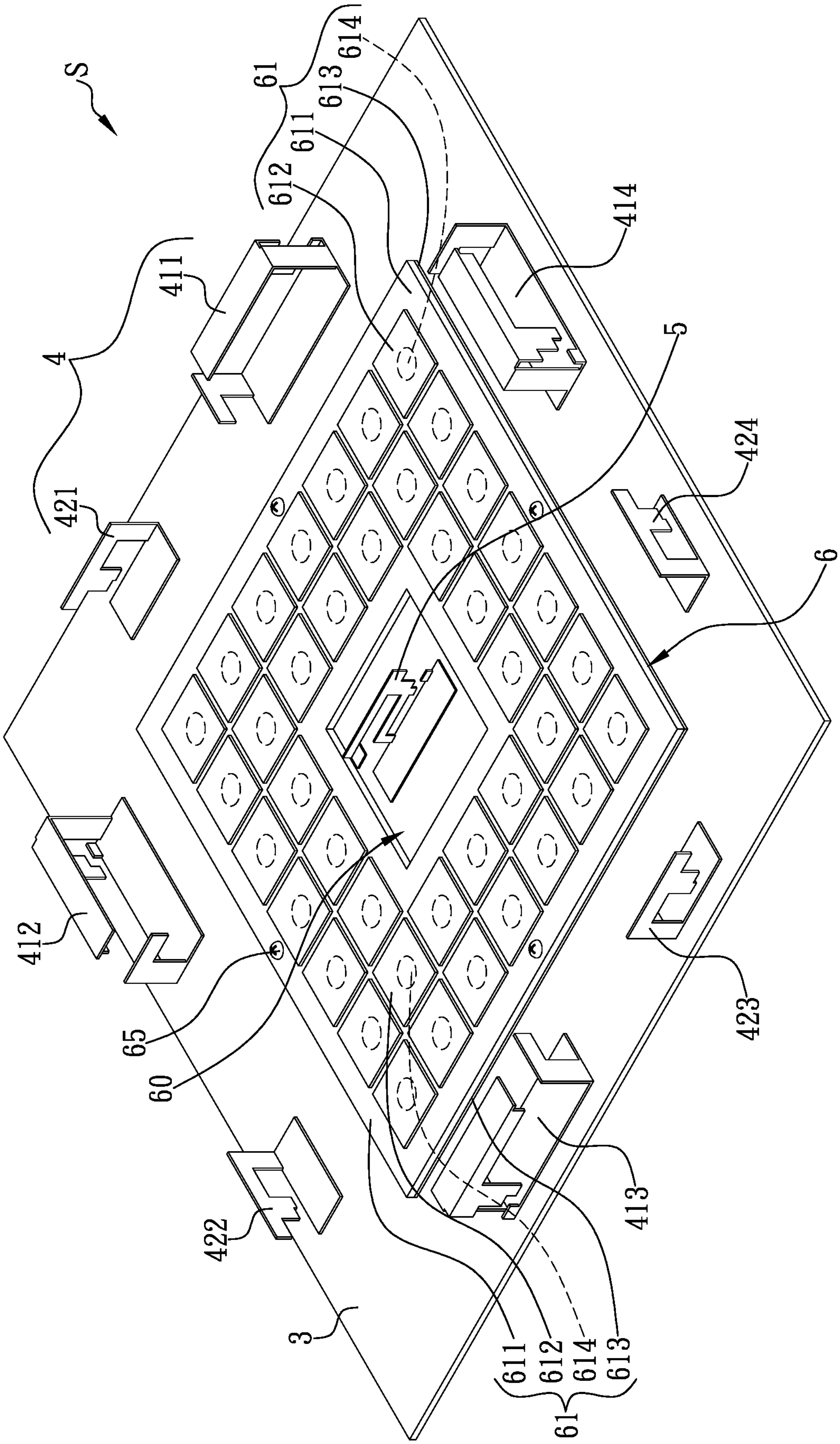
FIG. 11 is a schematic diagram of a MIMO antenna system according to certain other embodiments of the present disclosure.

In order to better isolate the background scanning antenna 5 from the working antennas 4, the plural isolators 61 in certain embodiments are arranged in two adjacent rings, or more particularly an inner ring and an outer ring surrounding the inner ring, so as to form the isolator module 6 in FIG. 11, which has a two-rectangular-ring configuration. In certain embodiments, the isolator module 6 has a single dielectric substrate 611, and the dielectric substrate 611 is a fiberglass board (FR-4 epoxy glass cloth) having a dielectric constant of about 4.3 and a thickness of about 1.6 mm. A plurality of metallic patches 612 are arranged on the top surface of the dielectric substrate 611 in a two-ring configuration. The metallic patches 612 are spaced apart from one another, and each metallic patch 612 is connected to a grounding layer 613 on the bottom surface of the dielectric substrate 611 through a metal post 614 that penetrates the dielectric substrate 611.

Figure 12:
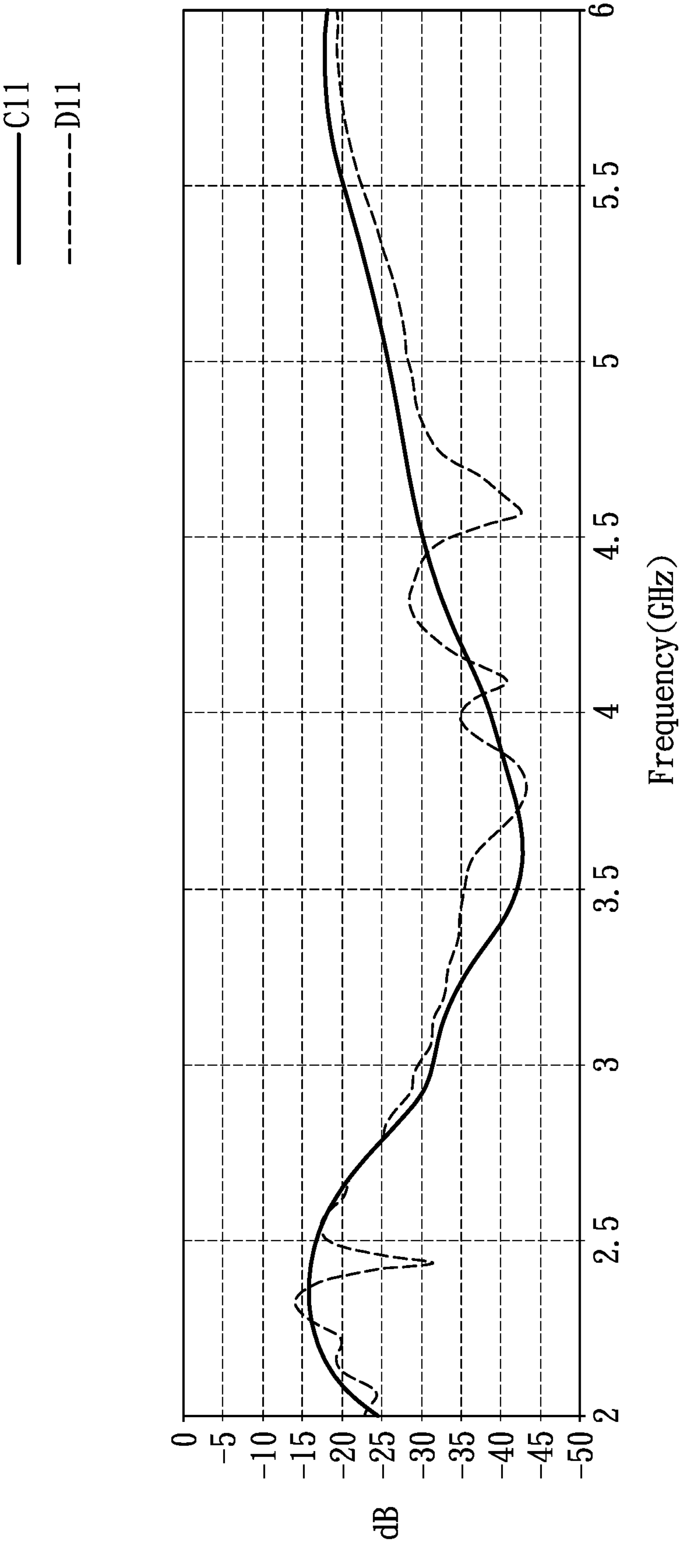
FIG. 12 is an isolation test diagram showing, in a 2.4 GHz operating band, the MIMO antenna system with and without an isolator module according to certain embodiments of the present disclosure.
Figure 13:
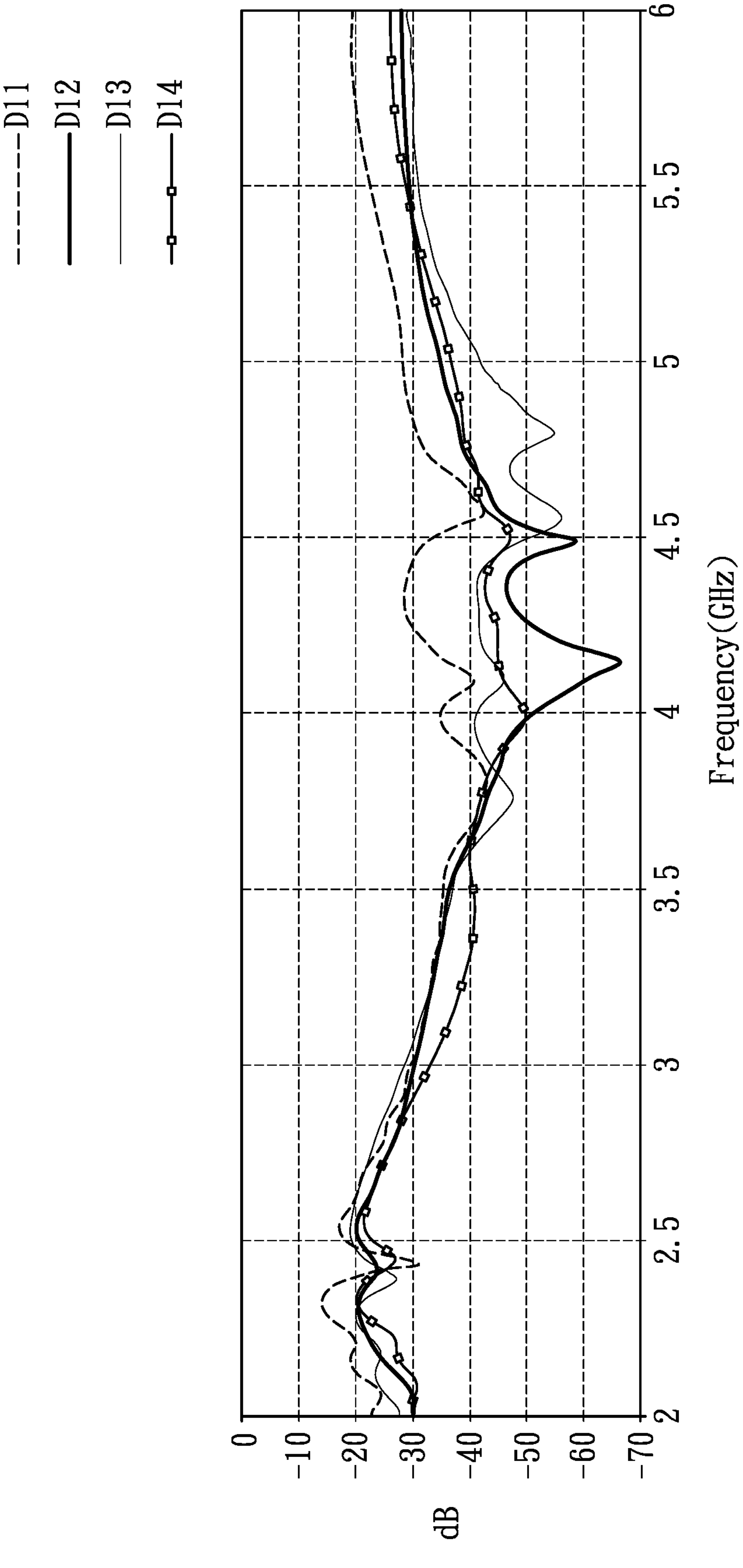
FIG. 13 is an isolation test diagram showing the isolation of the MIMO antenna system from respective low-frequency antennas in a 2.4 GHz operating band according to certain embodiments of the present disclosure.
Figure 14:
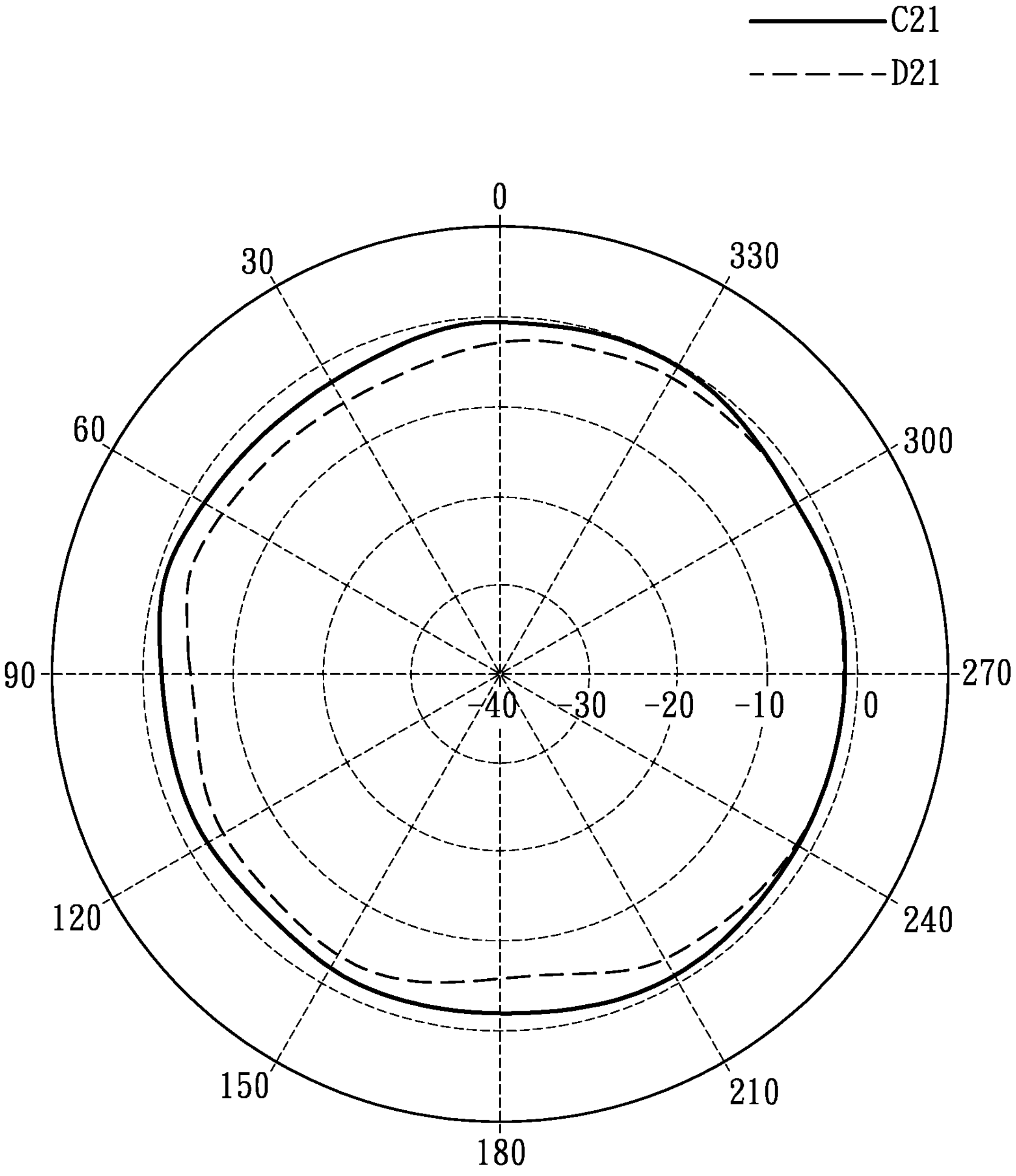
FIG. 14 is a 2.4 GHz radiation pattern diagram of a background scanning antenna in the MIMO antenna system with and without the isolator module according to certain embodiments of the present disclosure.

With the configuration above, referring to the test results shown in FIG. 12, when the MIMO antenna system S does not include the isolator module 6, the background scanning antenna 5 is isolated from the low-frequency antenna 411 to the extent represented by curve C11, and when the MIMO antenna system S includes the isolator module 6, the background scanning antenna 5 is isolated from the low-frequency antenna 411 to the extent represented by curve D11. Like its counterpart plotted for certain embodiments, curve D11 has a resonance mode in the 2.4 GHz operating band; furthermore, isolation of the background scanning antenna 5 from the low-frequency antenna 411 reaches 30 dB, which is better than that in a single-ring configuration. Referring to the test results in FIG. 13, when the MIMO antenna system S includes the isolator module 6, the background scanning antenna 5 is isolated from the low-frequency antennas 411, 412, 413, and 414 to the extents represented respectively by curves D11, D12, D13, and D14. Since all the curves D11, D12, D13, and D14 have a resonance mode in the 2.4 GHz operating band, it can be known that isolation of the background scanning antenna 5 from the low-frequency antennas 411, 412, 413, and 414 is effectively enhanced. Referring to the test results shown in FIG. 14, when the MIMO antenna system S does not include the isolator module 6, the background scanning antenna 5 has a 2.4 GHz radiation pattern represented by curve C21, and when the MIMO antenna system S includes the isolator module 6, the background scanning antenna 5 has a 2.4 GHz radiation pattern represented by curve D21. It can be seen in FIG. 14 that when the MIMO antenna system S includes the isolator module 6, the radiation pattern of the background scanning antenna 5 is slightly reduced but remained nearly omnidirectional in the XY plane.

Figure 15:
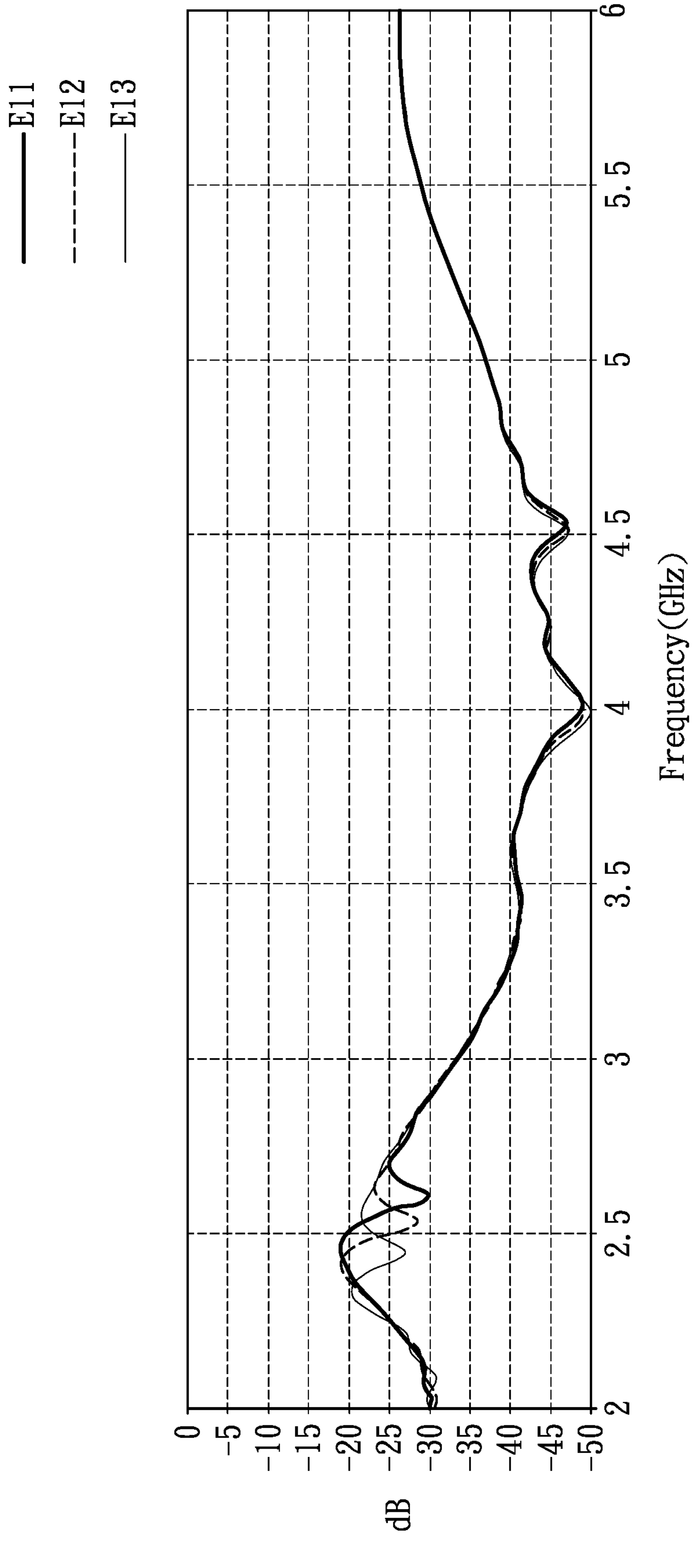
FIG. 15 is an isolation test diagram comparing MIMO antenna systems having metal posts of the isolators whose diameters are all 1.2 mm, all 1.0 mm or all 0.8 mm according to certain embodiments of the present disclosure.
Figure 16:
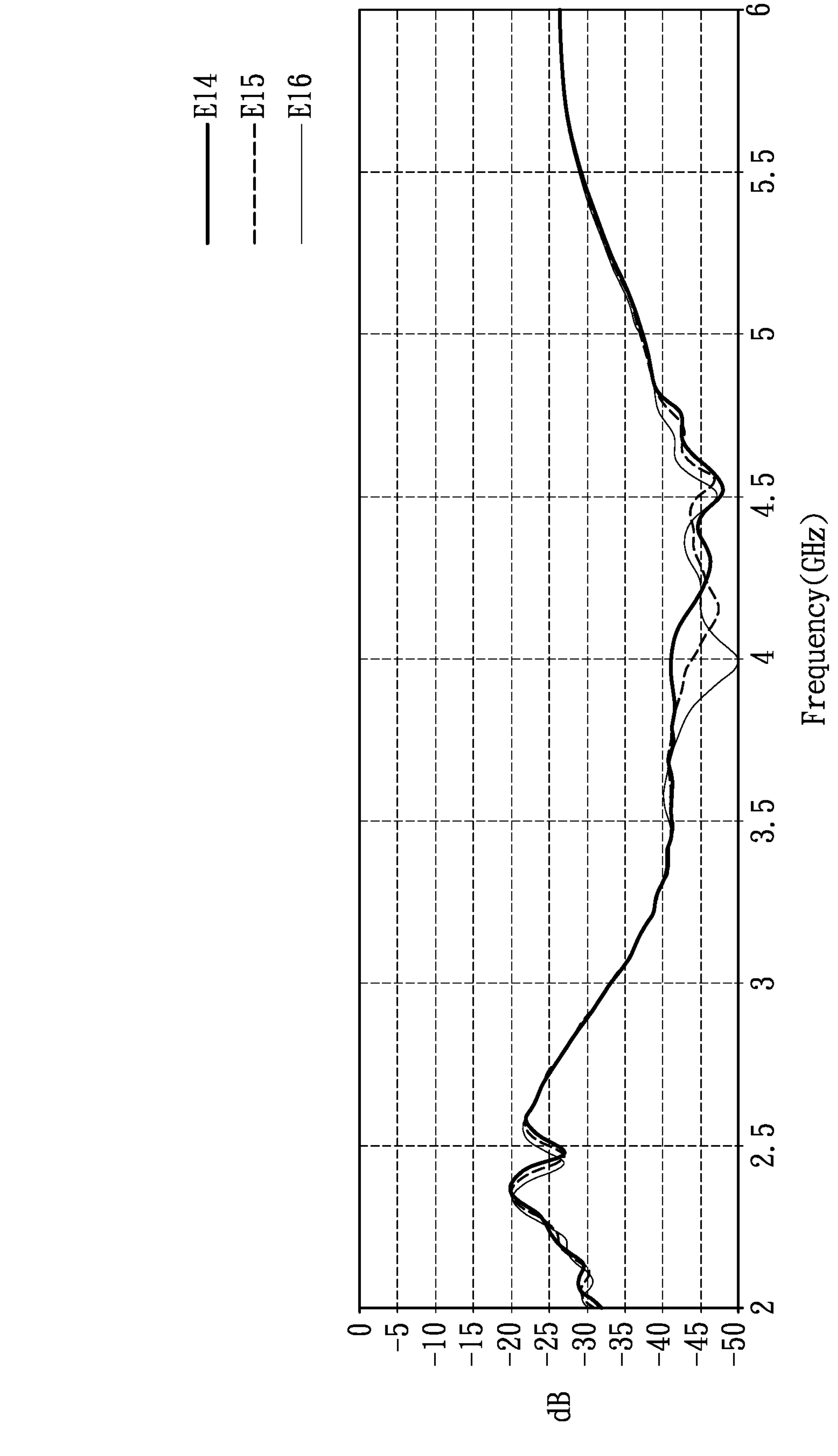
FIG. 16 is an isolation test diagram comparing MIMO antenna systems having metallic patches of the isolators whose respective areas are all 14.5 mm times 14.5 mm, all 14.7 mm times 14.7 mm, or all 14.9 mm times 14.9 mm according to certain embodiments of the present disclosure.

In addition, the isolation provided by the isolators 61 can be changed by changing the diameter of the metal posts 614. Referring to the test results shown in FIG. 15, when the diameter of each metal post 614 is 1.2 mm, the background scanning antenna 5 is isolated from the low-frequency antenna 414 to the extent represented by curve E11; when the diameter of each metal post 614 is 1.0 mm, the background scanning antenna 5 is isolated from the low-frequency antenna 414 to the extent represented by curve E12; and when the diameter of each metal post 614 is 0.8 mm, the background scanning antenna 5 is isolated from the low-frequency antenna 414 to the extent represented by curve E13. It can be seen in FIG. 15 that the smaller the diameter of each metal post 614, the lower the frequency at which resonance takes place. Moreover, the isolation provided by the isolators 61 can also be changed by changing the area (length times width) of each metallic patch 612. Referring to the test results shown in FIG. 16, when the area of each metallic patch 612 is 14.5 mm times 14.5 mm, the background scanning antenna 5 is isolated from the low-frequency antenna 414 to the extent represented by curve E14; when the area of each metallic patch 612 is 14.7 mm times 14.7 mm, the background scanning antenna 5 is isolated from the low-frequency antenna 414 to the extent represented by curve E15; and when the area of each metallic patch 612 is 14.9 mm times 14.9 mm, the background scanning antenna 5 is isolated from the low-frequency antenna 414 to the extent represented by curve E16. It can be seen in FIG. 16 that the smaller the area (length times width) of each metallic patch 612, the higher the frequency at which resonance takes place.

Figure 17:
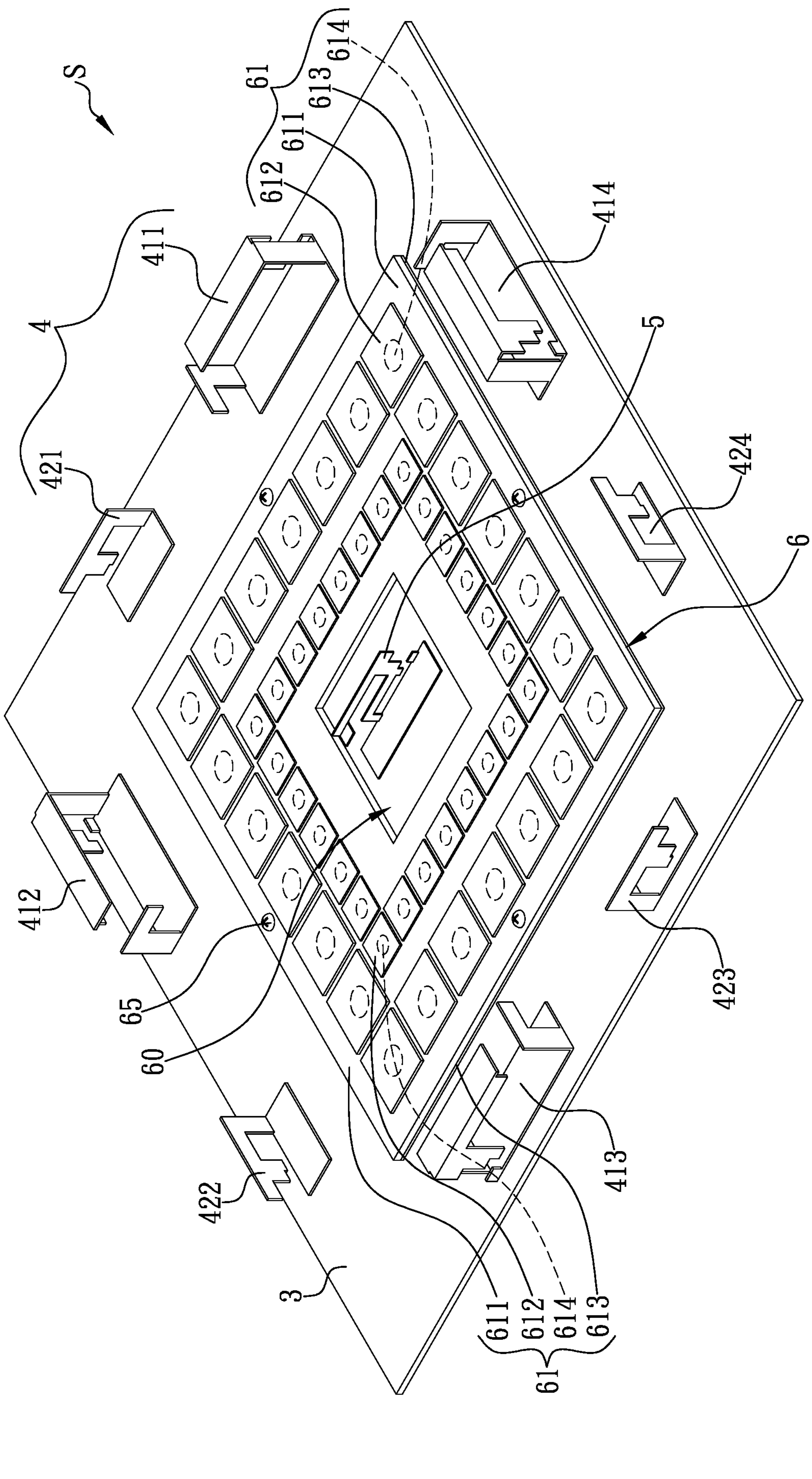
FIG. 17 is a schematic diagram of a MIMO antenna system according to certain embodiments of the present disclosure.
Figure 18:
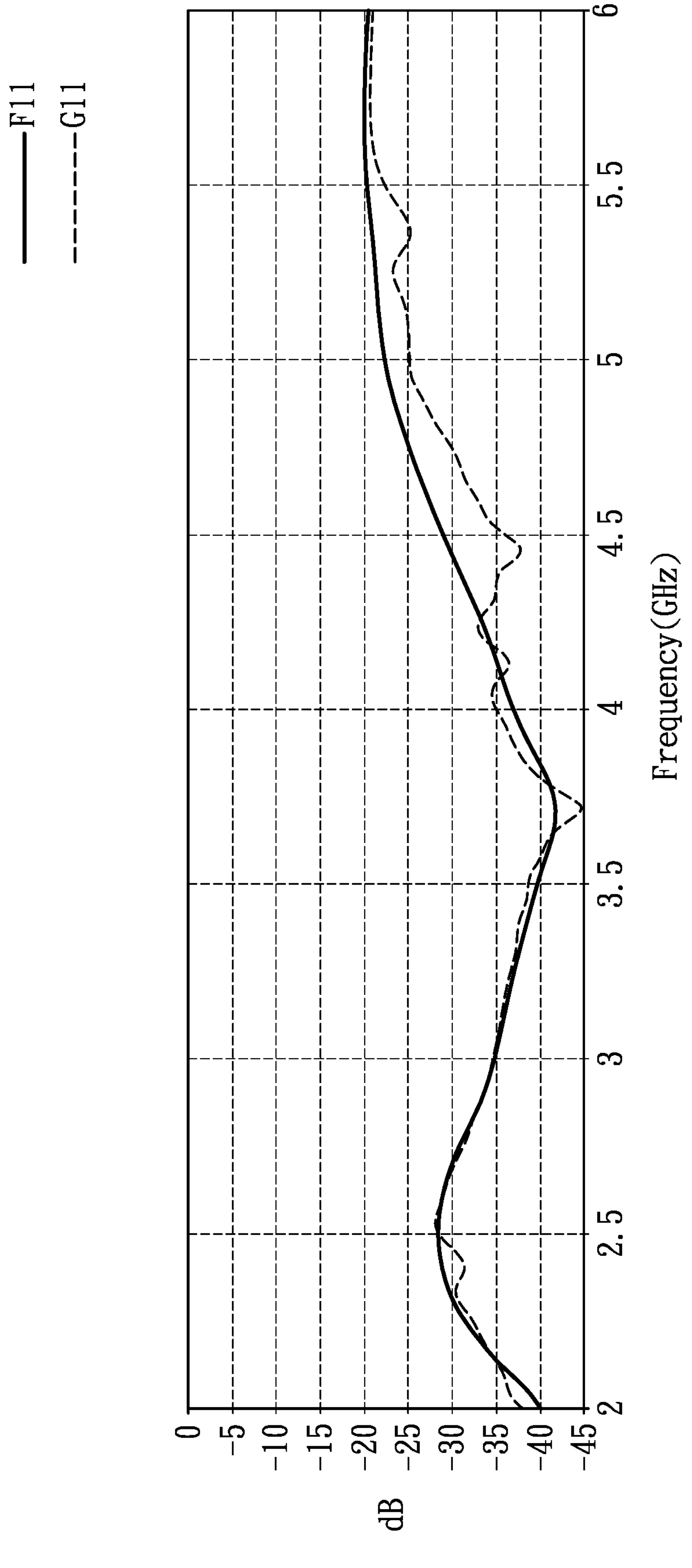
FIG. 18 is an isolation test diagram showing the MIMO antenna system with and without an isolator module in the 2.4 GHz and 5 GHz operating bands according to certain embodiments of the present disclosure.

As the size of the area of each metallic patch 612 affects the resonance frequency, the isolator module 6 according to the present disclosure can be configured to operate in two frequency bands. In certain embodiments, plural isolators 61 are arranged in two adjacent rings, or more particularly an inner ring and an outer ring surrounding the inner ring, so as to form the isolator module 6 in FIG. 17, which has a two-rectangular-ring configuration, the isolator module 6 has a single dielectric substrate 611, the dielectric substrate 611 is a fiberglass board (FR-4 epoxy glass cloth) having a dielectric constant of about 4.3 and a thickness of about 1.6 mm, and a plurality of metallic patches 612 are arranged on the top side of the dielectric substrate 611 in a two-ring configuration, in which a top area of each metallic patch 612 in the outer ring is larger than a top area of each metallic patch 612 in the inner ring. Each metallic patch 612 is connected to a grounding layer 613 on the bottom surface of the dielectric substrate 611 through a metal post 614 that penetrates the dielectric substrate 611. Thus, with the isolators 61 in the outer ring contributing to isolation in the 2.4 GHz operating band, and the isolators 61 in the inner ring contributing to isolation in the 5 GHz operating band, the dual-band background scanning antenna 5 can be better isolated from the working antennas 4 (e.g., the low-frequency antenna 411 and the high-frequency antenna 421) than when the isolator module 6 provides isolation in only one frequency band. Referring to the test results shown in FIG. 18, when the MIMO antenna system S does not include the isolator module 6, the background scanning antenna 5 is isolated from the high-frequency antenna 424 to the extent represented by curve F11, and when the MIMO antenna system S includes the isolator module 6, the background scanning antenna 5 is isolated from the high-frequency antenna 424 to the extent represented by curve G11. As can be seen in FIG. 18, curve G11 has a resonance mode in each of the 2.4 GHz operating band and the 5 GHz operating band, indicating that isolation of the background scanning antenna 5 from the high-frequency antenna 424 is enhanced in both operating bands.

According to the above, the isolator module 6 is structured to not only effectively enhance isolation between the working antennas 4 and the background scanning antenna 5, but also greatly increase the convenience of design by allowing the operating band(s) of the isolator module 6 to be easily changed by adjusting the configuration of a related element of each isolator 61.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-input multi-output antenna system, comprising:
- a metal plate;
- a scanning antenna located on the metal plate and configured to detect at least one radio-frequency signal in a scanning area;
- a plurality of working antennas located on the metal plate, each spaced apart from the scanning antenna; and
- an isolator module mountable to the metal plate and comprising a plurality of isolators arranged annularly to form an isolated space surrounded by the isolators, wherein the isolator module is located between the working antennas and the scanning antenna such that the scanning antenna is in the isolated space and the working antennas lie outside of the isolated space,
- wherein each of the isolators comprises a dielectric substrate, a metallic patch located at a top surface of the dielectric substrate, a grounding layer located at a bottom surface of the dielectric substrate and connectable to the metal plate, and a metal post penetrating the dielectric substrate and having a top end connectable to the metallic patch and a bottom end connectable to the grounding layer, and the dielectric substrate of each of the isolators is integrally formed with each other as a single unit; and
- wherein the isolators are arranged as an inner ring and an outer ring adjacent to and surrounding the inner ring.

2. The multi-input multi-output antenna system according to claim 1, wherein the metallic patches of the isolators are spaced apart from each other.

3. The multi-input multi-output antenna system according to claim 1, wherein a top area of each metallic patch in the outer ring is larger than a top area of each metallic patch in the inner ring.

4. The multi-input multi-output antenna system according to claim 1, wherein the metal plate is connected to a grounding.

5. An isolator module for increasing isolation of a scanning antenna, comprising a plurality of isolators arranged annularly to form an isolated space surrounded by the isolators for placing the scanning antenna therein and isolating a plurality of working antennas from the isolated space and the scanning antenna therein, wherein each of the isolators comprises a dielectric substrate, a metallic patch located at a top surface of the dielectric substrate, a grounding layer located at a bottom surface of the dielectric substrate, and a metal post penetrating the dielectric substrate and having a top end connectable to the metallic patch and a bottom end connectable to the grounding layer, the dielectric substrate of each of the isolators is integrally formed with each other as a single unit, and the isolators are arranged as an inner ring and an outer ring adjacent to and surrounding the inner ring.

6. The isolator module according to claim 5, wherein the metallic patches of the isolators are spaced apart from each other.

7. The isolator module according to claim 5, wherein a top area of each metallic patch in the outer ring is larger than a top area of each metallic patch in the inner ring.

8. A multi-input multi-output antenna system, comprising:
- a metal plate;
- a scanning antenna located on the metal plate and configured to detect at least one radio-frequency signal in a scanning area;
- a plurality of working antennas located on the metal plate, each spaced apart from the scanning antenna; and
- an isolator module mountable to the metal plate and comprising a plurality of isolators arranged annularly to form an isolated space surrounded by the isolators, wherein the isolator module is located between the working antennas and the scanning antenna such that the scanning antenna is in the isolated space and the working antennas lie outside of the isolated space,
- wherein each of the isolators comprises a dielectric substrate, a metallic patch located at a top surface of the dielectric substrate, and a metal post penetrating the dielectric substrate and having a top end connectable to the metallic patch and a bottom end connectable to the metal plate, and the dielectric substrate of each of the isolators is integrally formed with each other as a single unit; and
- wherein the isolators are arranged as an inner ring and an outer ring adjacent to and surrounding the inner ring.

9. The multi-input multi-output antenna system according to claim 8, wherein the metallic patches of the isolators are spaced apart from each other.

10. The multi-input multi-output antenna system according to claim 8, wherein a top area of each metallic patch in the outer ring is larger than a top area of each metallic patch in the inner ring.

11. An isolator module for increasing isolation of a scanning antenna, comprising a plurality of isolators arranged annularly to form an isolated space surrounded by the isolators for placing the scanning antenna therein and isolating a plurality of working antennas from the isolated space and the scanning antenna therein,
- wherein each of the isolators comprises a dielectric substrate, a metallic patch located at a top surface of the dielectric substrate, and a metal post penetrating the dielectric substrate and having a top end connectable to the metallic patch and a bottom end extending out of the dielectric substrate and connectable to a metal plate for carrying the scanning antenna and the working antennas, and the dielectric substrate of each of the isolators is integrally formed with each other as a single unit; and
- wherein the isolators are arranged as an inner ring and an outer ring adjacent to and surrounding the inner ring.

12. The isolator module according to claim 11, wherein the metallic patches of the isolators are spaced apart from each other.

13. The isolator module according to claim 11, wherein a top area of each metallic patch in the outer ring is larger than a top area of each metallic patch in the inner ring.

* * * * *